May 9, 1967  W. RODENACKER  3,317,952
MIXING AND KNEADING APPARATUS
Filed Oct. 18, 1962  6 Sheets-Sheet 1

INVENTOR.
WOLF RODENACKER
BY
ATTORNEYS

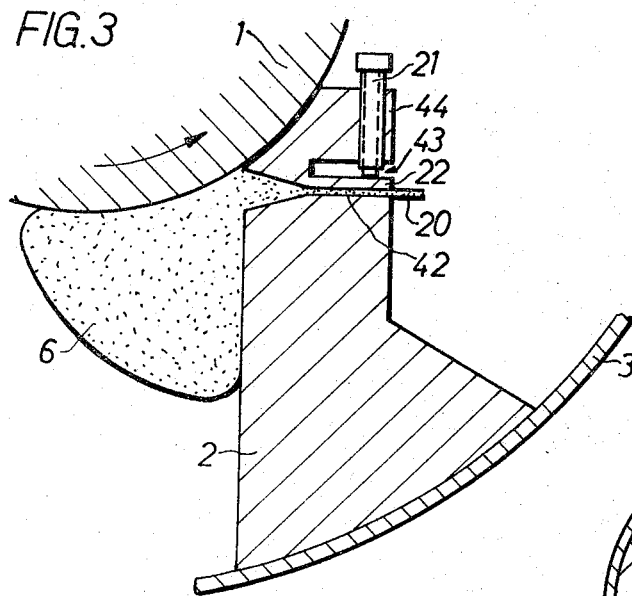
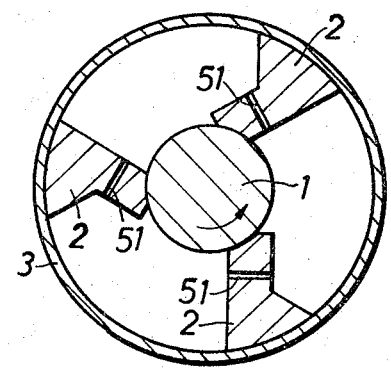
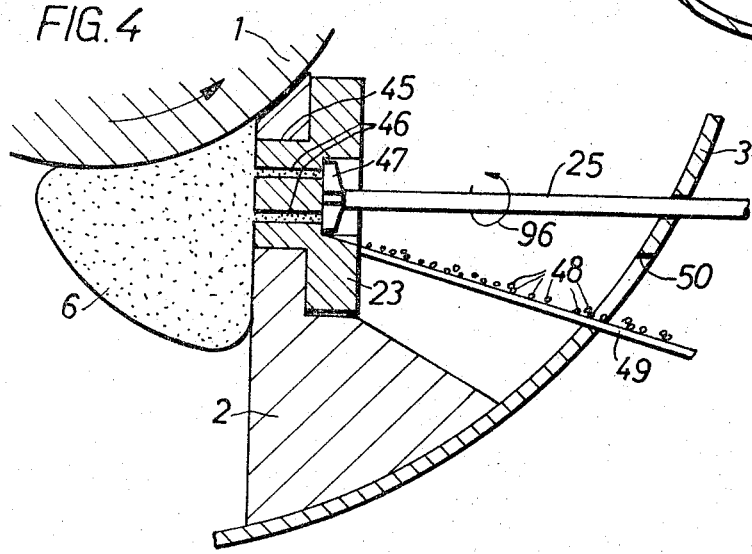

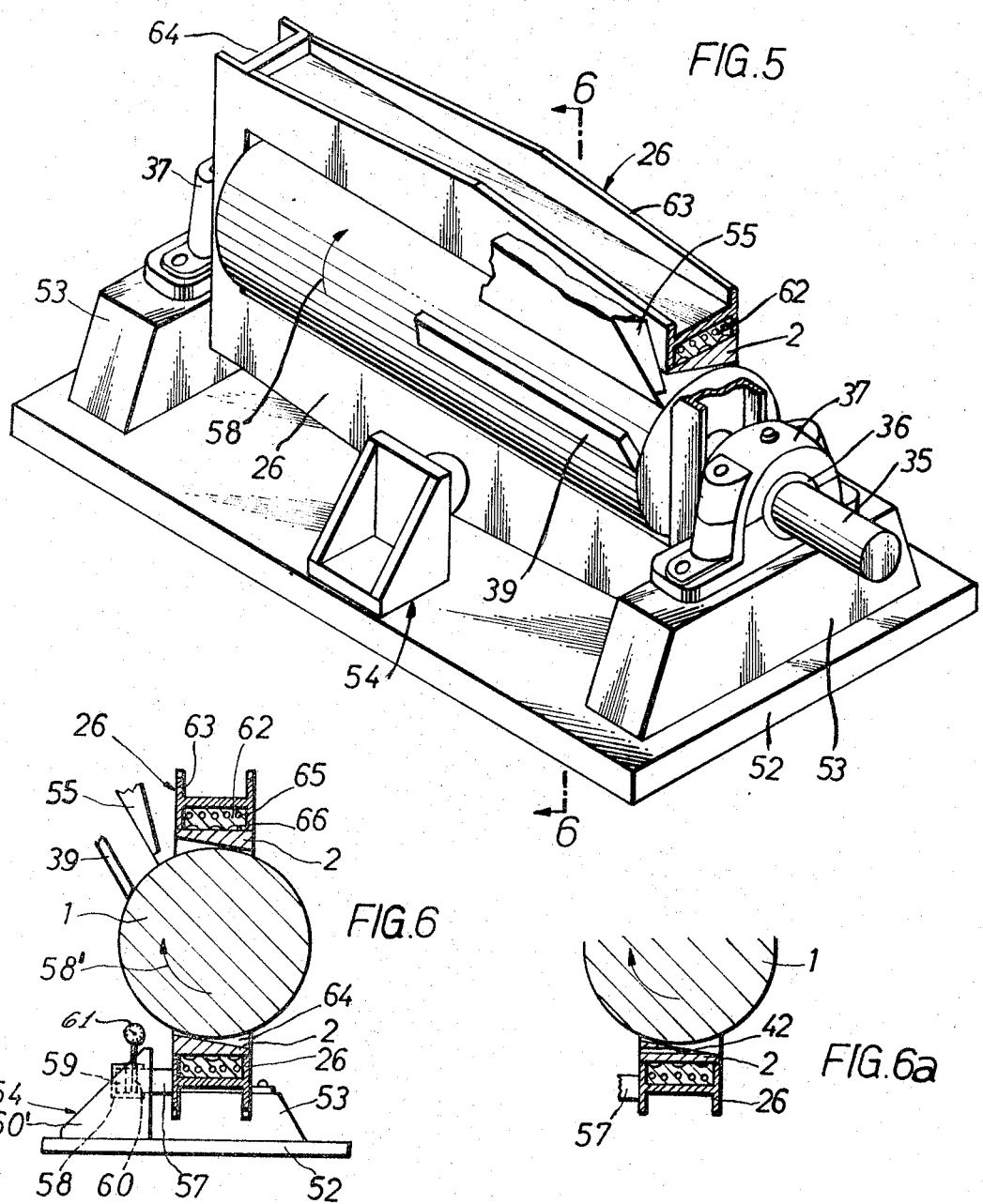

INVENTOR.
WOLF RODENACKER
BY
Burgess, Dinklage + Sprung
ATTORNEYS

May 9, 1967 W. RODENACKER 3,317,952
MIXING AND KNEADING APPARATUS
Filed Oct. 18, 1962 6 Sheets-Sheet 5

INVENTOR.
WOLF RODENACKER
BY
Burger, Dinklage & Sprung
ATTORNEYS

INVENTOR.
WOLF RODENACKER
ATTORNEYS

United States Patent Office 3,317,952
Patented May 9, 1967

3,317,952
MIXING AND KNEADING APPARATUS
Wolf Rodenacker, Dormagen, Germany, assignor to Farbenfabriken Bayer Aktiengesellschaft, Leverkusen, Germany, a corporation of Germany
Filed Oct. 18, 1962, Ser. No. 231,426
Claims priority, application Germany, Feb. 8, 1957, F 22,304
24 Claims. (Cl. 18—2)

This application is a continuation-in-part of application Ser. No. 712,582, filed Jan. 31, 1958, and now abandoned.

This invention relates to means for working materials, in particular, materials such as plastics and rubber.

In the plastics and rubber industry, various forms of apparatus are known for either plasticizing of the material or for the incorporating therein of softeners, dye-stuffs, fillers, or vulcanizing agents. Commonly, two parallel spaced rolls rotated at different rates are used, the material being worked between the rolls. The forces on the rollers are taken up by large bearings, and the bearings and springs are headed since the forces involved are great. Also known are roller frames with three rollers which are positioned around a center roller (U.S. Patent 1,106,484), and roller plants with projecting pins (British Patent 276,356) which increase the mixing effect. Also known are devices wherein a housing is closely spaced from a cylindrical rotating roller and a material is worked between the roller and housing (U.S. Patent 2,586,607). Further, it is also known to employ machines in which parallel disposed rollers of hexagonal cross-section rotate in opposite direction and work material fed to between the rollers (U.S. Patent 2,516,543).

A principal object of the invention is to provide a machine of the character described, characterized in that provision is made for the dissipation of the heat generated during the working of the material so that relatively small bearings can be used.

Another object of the invention is to provide a procedure and a machine for the working of material in a manner such that the material can be delivered from the working operation in the form of a sheet.

Further, it is an object of the invention to provide for the working of material in a manner such that the material can be delivered from the working operation as a granulated material.

Also, it is an object of the invention to provide for the working of material in a manner such that following the working thereof it can be delivered from the working operation by the extruding thereof.

It is another object of the invention to provide a machine and procedure for the working of material characterized in that provision is made for sensing the extent to which the machine capacity is being utilized. Thus, according to the invention, means can be provided which will indicate the forces generated during the working operation, and since such forces are dependent upon the extent to which the capacity of the machine is being utilized, provision can be made for indicating the capacity utilized and for controlling the operation of the machine.

Still another object of the invention is to provide a machine for the working of material characterized in that means are provided for separating material not thoroughly worked from material which is thoroughly worked, in a manner such that the material not thoroughly worked is subjected to more working action to the end that uniformly thorough working of all the material will be obtained.

A further object of the invention is to provide means for separating and removing from a mass of material being worked, material which is not thoroughly mixed, so as to leave as a product of the working operation material which is thoroughly mixed.

The invention is described with reference to the accompanying drawings, of which:

FIG. 3 is a partial view of an axially transverse cross-section of an embodiment of the device;

FIG. 3a is an axially transverse cross-section of equipment generally similar to that shown in FIG. 3 and FIG. 4;

FIG. 4 is a partial view of an axially transverse cross-section of an alternative to the devices of FIGS. 1–3;

FIG. 5 is an isometric view of a device according to the invention and having a resilient mounting for the impingement means;

FIG. 6 is an axially transverse cross-section of the device shown in FIG. 5 and taken along the line generally indicated by the line 6—6 in FIG. 5;

FIG. 6a is an alternative to the construction indicated in FIG. 5 and FIG. 6;

Figure 14:
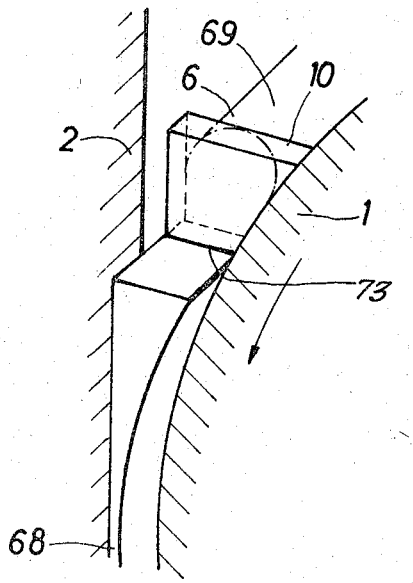
FIG. 14 is a view corresponding with FIG. 10, and illustrating an alternative arrangement for the weir.
Figure 17:
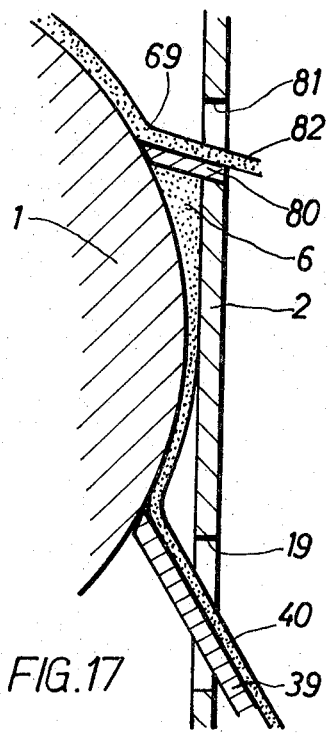
Figure 15:
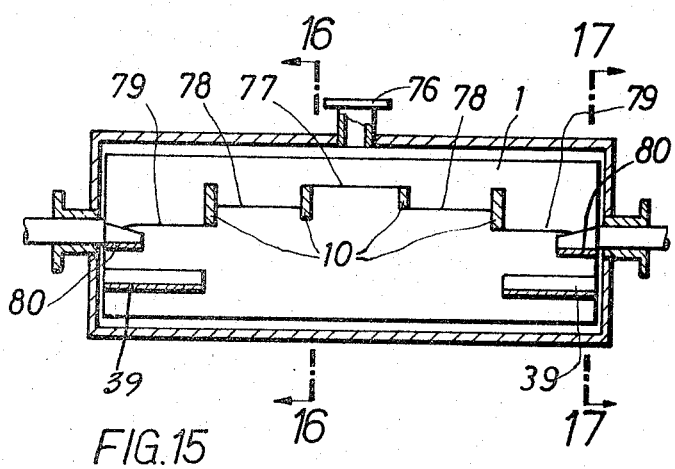
Figure 16:
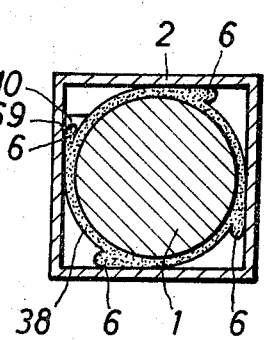

FIG. 15 is an elevation view in partial section of a device provided with a plurality of weirs as are indicated in FIG. 14; and FIGS. 16 and 17 are axially transverse cross-sections, taken, respectively, along lines 16—16 and 17—17 in FIG. 15.

In my U.S. Patent 2,942,656, there is disclosed apparatus and a procedure for the subjecting of liquid of viscous material to heat to effect evaporation thereof or evaporation of a part thereof. According to my prior patent, a cylinder is rotatably mounted within a vessel and an elongated surface member is positioned in the vessel to provide a surface spaced from the said cylinder and for cooperation therewith as will now be described. The surface element is spaced from the cylinder so that a wedge-shaped space is provided between the cylinder and the surface element. In operation, the cylinder is rotated while the surface element is maintained fixed relative to the cylinder, a liquid or viscous material to be treated is fed to the space between the cylinder and surface element and by operation of forces acting on the material, a body of the material is maintained in the space between the cylinder and surface element. At the same time, the cylinder carries away from said body of material a film of the material and exposes this film to the conditions applied in the housing. By supplying heat to the device, a film evaporation operation can be obtained.

It has now been found that apparatus of the type disclosed in my aforementioned patent can be used for working of materials such as rubber and plastic to effect, for example, kneading.

According to the invention, material is kneaded by use of apparatus comprising a smooth surface center roller, means for rotating the roller, and at least two material impingement means disposed about the center roller proximate thereto and at circumferentially spaced intervals. The impingement means are fixably mounted with respect to the roller. Each material impingement means is provided to accumulate material to be kneaded in a wedge between itself and the center roller, and in which the material moves for the kneading thereof. The accumulation and movement of the material in the wedge is response of the material to action of the roller in forcing it into impingement with the impinging means. In the utilization of such apparatus according to the invention, the procedure includes the step of supplying material to be kneaded to the roller for engagement thereby to move the material into impingement with the impinging means, and the step of withdrawing material kneaded as aforesaid from the apparatus.

The impingement means of the apparatus described above can be radially spaced from the said roller so as to permit passage of material being kneaded from a wedge at one impingement means, between the impingement means and the roller, and on to the wedge at the next adjacent impingement means.

A feature of the invention is that relatively small bearings can be used for the center roller. Thus, according to the invention, the roller can have roller necks at each end thereof, and each of the end necks can be operatively mounted in a bearing for the roller. Further, the various impingement means of a given apparatus are preferably spaced about the circumference of the roller, so that the forces imposed on the roller by the material at each impingement means, balance one another, whereby the bearing load is reduced.

In one embodiment of the invention, the apparatus includes a roller, means for rotating the roller, and a material impingement means disposed proximate thereto for accumulation of material to be worked in a wedge between the roller and the impinging means in response to action of the roller on the material. Further, means are provided which define a passageway through the impingement means and for extrusion of material from the wedge through the impingement means, whereby material worked by the roller can be extruded through the impingement means.

Such apparatus is exemplified in FIG. 3 and FIG. 3a.

Apparatus including means for extruding material worked can further include means for granulating the material as it issues from the passageway provided by the extrusion. Such apparatus is exemplified in FIG. 4.

In the apparatus embodiments wherein means are provided for extrusion, the roller is preferably one having a smooth surface, and the impingement means is preferably disposed in close-fitting relation to the roller to substantially prevent passage of material between the roller and the impingement means through from one side of the impingement means to the other side thereof.

Where means are provided for extrusion, there are preferably at least two material impingement means and these means are disposed at circumferentially spaced locations about the roller, to balance the load on the roller resulting from the working of the material. The spacing can be such that the impingement means are circumferentially spaced at equal angles.

In one embodiment of the apparatus of the invention, a resilient mounting is provided for the material impingement means. The resilient mounting can be provided so as to obtain a response to torque imposed on the impingement means by the working of the material, and means can be provided for sensing of the response of the resilient mounting to the torque. Thus, since the magnitude of the torque is dependent upon the extent to which the capacity of the machine is utilized, a resilient mounting can be employed to indicate and/or control the capacity at which the machine is operated. As to embodiments of the type here referred to, see FIG. 5.

Figure 7:
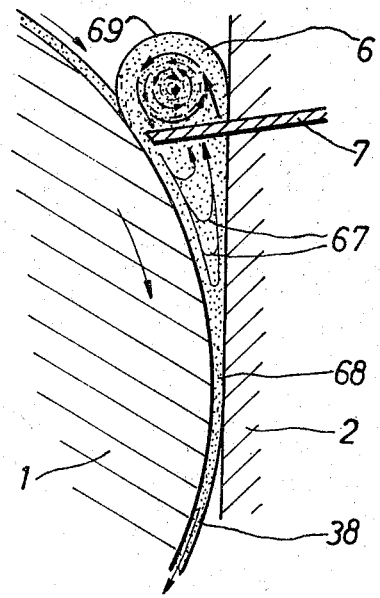
FIG. 7 is an axially transverse cross-section of a portion of a device according to the invention, which is characterized in that an axially extending baffle is provided.

In one embodiment of the apparatus of the invention wherein a roller is provided for cooperation with an impingement means for working material and so that a wedge of material forms between the roller and the impingement means, an axially extending baffle is disposed between the roller and impingement means within and transverse to the wedge of material, the baffle being spaced from the roller whereby in the kneading of material, relatively large size particles will accumulate above (upstream) of the baffle and be retained therefor extra kneading thereof. In the kneading and working action which occurs in the wedge which forms between the roller and the impingement means, it has been observed that the relatively large size particles which have not been worked into the material so as to form therewith a homogeneous mass, tend to accumulate at the upstream or broad end of the wedge. According to the invention, a baffle can be disposed within the wedge to accentuate this tendency toward a separation, and in this manner, the natural action of the wedge can be improved upon. Further, in this embodiment, the roller and impingement means can be spaced from each other so that material of the wedge is extruded between the roller and impingement means from the apex of the wedge. An embodiment as is described here is shown in FIG. 7.

In one construction according to the invention, the impingement means of the invention is employed in combination with kneading devices of known construction, and characterized in that they include a roller, means for rotating the roller, and means for cooperating with the roller to knead the material in response to rotation of the roller, and in that they further include an inlet for feeding material to the roller and the said cooperating means for the kneading of the material, and an outlet axially spaced from the inlet and for withdrawing material following the kneading thereof. In these devices, there is axial flow of the material, and this flow can be obtained by any means suitable to impart such movement to the material. The material can be of such a nature that it flows, e.g. the material can be in a semifluid condition. Alternatively, mechanical means can be used to advance the material axially of the roller. According to the invention, impingement means can be disposed about the roller proximate thereto, and fixably positioned with respect thereto, and the impingement means is for accumulation of material to be kneaded in a wedge between the impingement means and the roller and the material within the wedge moves so that the desired kneading results. The accumulation and movement are response to the material to action of the roller in forcing into engagement with the impingement means.

Figure 8:
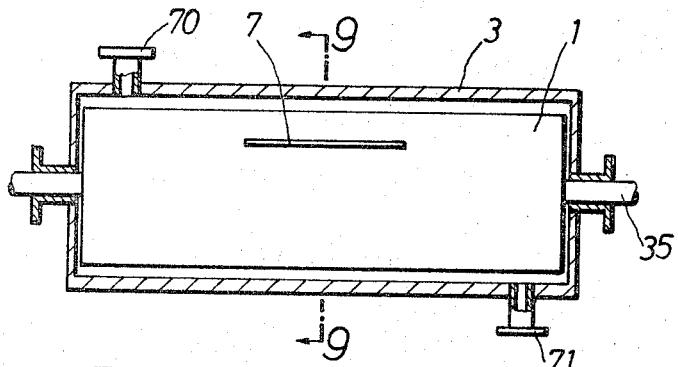
FIG. 8 is an axial cross-section of a kneading apparatus provided with a baffle according to the invention.

In the embodiment described above, wherein impingement means is used in combination with a kneading device having axially spaced inlet and outlet means, a particularly desirable construction is one in which a baffle, as is described above, is employed, and the baffle can be provided so that it extends over but part of the distance between the inlet and outlet. This will provide a hold-up of material which is not throughly kneaded, so that the not thoroughly kneaded material will be retained between the inlet and outlet at the baffle until it is thoroughly kneaded, and will then pass on from the baffle toward the outlet. Such a construction is depicted in FIG. 8.

Figure 11:
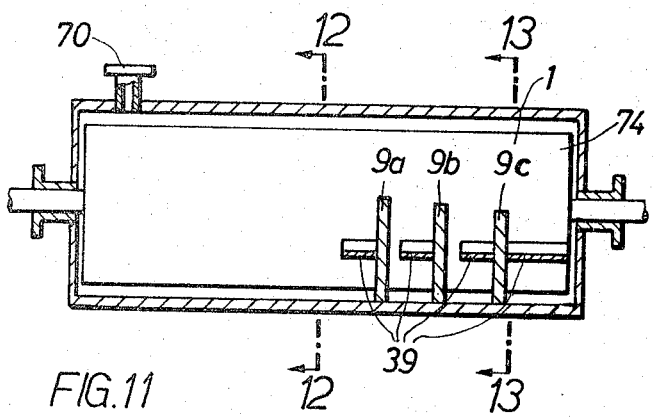
FIG. 11 is an elevation view, partly in cross-section, of a device according to the invention, and provided with weirs.
Figure 12:
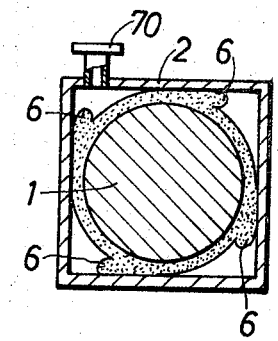

Instead of, or in combination with, a baffle as is described above, which, as described, is an axially extending element, devices for kneading and including an inlet and an axially spaced outlet, can include an axially transverse weir disposed between the roller and impingement means and transverse to the wedge of material for controlling axially directed passage of material in the wedge. Such devices are depicted in FIGS. 10–16.

Where a weir is employed, the impingement means and the roller can be spaced so that material of the wedge formed between the impingement means and the roller are extruded between the impingement means and the roller from the apex of the wedge. Further, such equipment can include a withdrawal means adjacent the weir and on the inlet (or upstream) side thereof, and another withdrawal means on the outlet side (downstream side) of the weir for withdrawal of material which pases over the weir. Such construction provides operation in the manner that thoroughly kneaded material is withdrawn without subjecting such material to all of the kneading action provided by the device, whereas material which is not thoroughly kneaded is retained in the device until the desired thorough kneading is effected. There can be a plurality of weirs, the weirs being axially spaced along the roller, and the height of the weirs can decrease in the direction of material movement from the inlet to the outlet. The weirs can extend from the apex of the wedge toward the wedge broad end. Such construction is depicted in FIG. 11.

In the construction wherein weirs are provided, the weir or weirs can extend from adjacent the broad end of the wedge toward the apex thereof and terminate short of the wedge apex. Such a construction is indicated in FIG. 14.

In a further modification of a device according to the invention, the device can include a roller and impingement means for operation as described above, to provide a wedge between the roller and impingement means, in which the material is kneaded, and the device can further include an inlet disposed intermediate the ends of the roller, and an outlet at each end of the roller. In such embodiment, the flow of material is to the center of the roller, and thence axially outwardly in two paths, one toward each end of the roller. Interposed between the inlet and each end thereof is a weir, of the construction described above, and which extends from adjacent the broad end of the wedge toward the apex thereof and terminates short of the apex. Further, withdrawal means are provided intermediate each outlet and its adjacent weir, whereby material passing beyond the weir toward its adjacent outlet, can be removed from the device. Desirably, at least two weirs as just described are provided on each side of the feed means and the approach to the apex by the weirs decreases in a direction away from the feed means or inlet. In the embodiment described here, the impingement means and the roller are spaced so that material is extruded between the impingement means and the roller from the apex of the wedge. The device can further include a head cutting means which is disposed on the outlet side of the weir remote from the inlet or feed means. A head cutting means can be provided at each end of the device. The head cutting means is for separating material from the broad end of the wedge thereof to remove from said material a portion of the head thereof, whereby material not thoroughly kneaded can be removed from the device separate from material which is thoroughly kneaded. Whereas in the construction described here, it is desirable to employ a central feed or inlet and an outlet at each end of the roller, if desired, the inlet can be disposed at one end of the roller and the outlet can be disposed at the other end. A construction as described here is depicted in FIG. 15. The weirs are as disclosed in FIG. 14.

In the drawings, like reference characters indicate corresponding parts.

Figure 1:
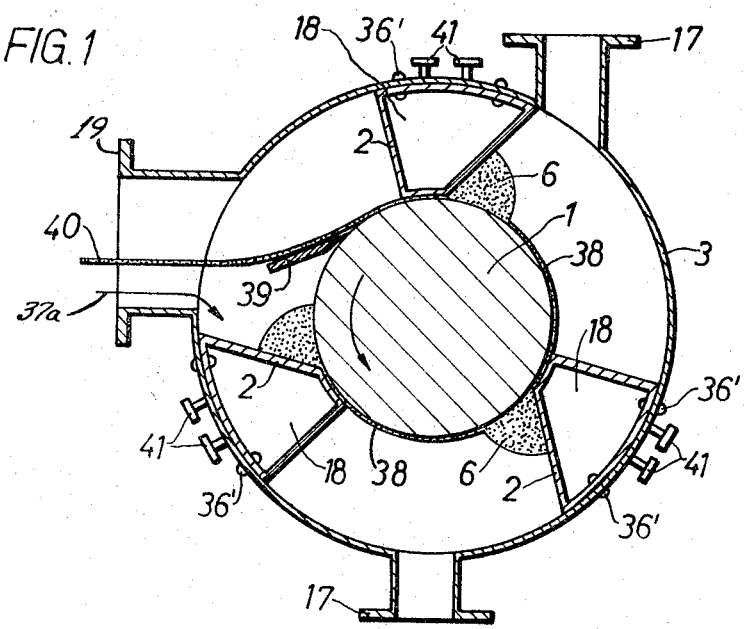
FIG. 1 is an axially transverse cross-section on line 1—1 in FIG. 2.
Figure 2:
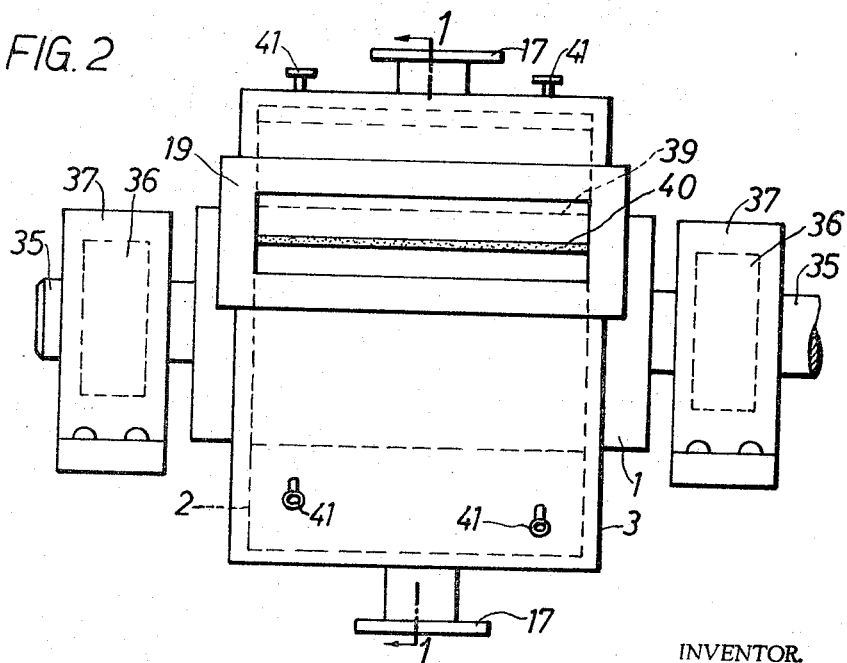
FIG. 2 is an end elevation view of the device shown in FIG. 1.

Referring to FIG. 1 and FIG. 2, there is shown a device for kneading material. This device includes a smooth surface center roller 1, having roller necks 35 disposed one at each end of the roller. The roller necks 35 are of reduced diameter with respect to the roller 1, and are received in bearings 36 which are contained in the journal blocks 37. Thus, the roller is provided for rotation and can be rotated by the imparting of rotary motion to one of the end necks 35. The roller 1 is contained in an outer casing 3 and interposed between the casing 3 and the roller 1, are at least two, as illustrated, three, impingement elements 2. The impingement elements are disposed at circumferentially spaced intervals and are fixably mounted with respect to the roller by securing the elements to the casing 3 with rivets 36'. The impingement elements 2 are disposed with respect to each other so that forces imposed on the roller by material worked in the apparatus balance one another. Where, the load at each impingement element 2 is the same, the impingement elements to balance the forces acting on the roller, can be spaced at equal circumferential intervals.

The casing 3 is provided with a passage way 19 via which material can be introduced and removed from the apparatus. Thus, material can be introduced so that it follows the path indicated by the arrow 37a, and so that, following its introduction into the casing 3, it will be engaged by the roller 1. The roller 1 will cause the material to be kneaded to accumulate in a mass having the form of a wedge and disposed between the roller and the adjacent impingment element 2. The impingement elements are spaced from the roller 1 so that material is extruded between the roller and the impingement element from the wedge of material which forms between the roller and the impingement element. Thus, a layer 38 of material forms on the roller 1 and passes from one impingement element on to the next. The layer, upon engaging an impingement element, is disrupted so that a wedge forms at the impingement element approach by the layer. Thus, in the operation of the apparatus, a wedge 6 forms at each impingement element 2. The material within the wedges 6 moves so that kneading thereof occurs, and this movement is response of the material to action of the roller in forcing the material into engagement with the impingement means. Thus, the material may move in a circle within the wedge.

To remove material which has been kneaded, a doctor blade 39 is placed in engagement with the roll 1 and peels the forward layer from the roller. This provides the removed layer 4 which can be withdrawn through the passageway 19.

By reason of the balancing of forces applied to the roller 1 as a result of the working of the material, substantially smaller end bearings for the roller can be employed. This is a marked advantage of the equipment in comparison to prior art equipment employed for the same service.

The passageways 17 are provided so that each of the spaces between impingement elements 2 can be communicated with the outside of the device. This permits removal of vapors, if desired, from the material being kneaded, and thus permits the simultaneous kneading and drying or similar treatment, of the material. Further, the impingement elements 2 are made hollow, and the inlet-outlet connections 41 are provided for each impingement. A heating or cooling medium can thus be circulated through the impingement elements. Thus, material can be heated or cooled while being worked.

In FIGS. 3, 3a, and 4, an embodiment of the invention is illustrated in which means are provided which define a passageway through the impingement means for extrusion of material from the wedge through the impingement means. In the embodiment shown in FIG. 3, the impingement element 2 is in close-fitting relation with the smooth surface roller 1 so that substantially no material is extruded by the roller between the roller and the impingement means. The impingement means 2, however, is provided with a passageway 42 which extends through the impingement means and is disposed so that material will be extruded therethrough by reason of the action of the roller on the wedge of material 6.

Means are provided for adjusting the cross-sectional area of the passageway 42. Thus, the impingement means is provided with a cut 43 which provides the narrow lip 22 proximate to the extrusion passageway 42, and the heavy lip 43 on the opposite side of the cut from the lip 22. A jack screw 21 is threaded through the heavy lip 44 and works on the lip 22. By operation of the jack screw 21, the cross-sectional area of the opening can be altered. In the operation of the embodiment shown in FIG. 3, the layer 20 is extruded through the passageway 42.

In the embodiment shown in FIG. 4, the impingement element 2, adjacent the roller 1, is provided with an opening 45, and an insert 23 is disposed in this opening. This insert has a plurality of openings 46 extending therethrough and provided to communicate one side of the impingement element with the other side thereof, so that the holes are available for the extrusion therethrough of material from the wedge 6. A cutter 25 having end blades 47, is provided to permit rotation thereof as is indicated by the arrow 96, and, upon such rotation, the end blades 47 cut the filaments of material issuing through the passageways 46, so as to provide the material in the form of granules 48. The granules 48 drop onto the tray 49 and leave the device through the outlet opening 50.

In FIG. 3a, there is indicated a device generally in accordance with the embodiment of FIG. 3 and FIG. 4, and characterized in that there are a plurality of impingement elements 2 disposed within the casing 3, each impingement element having a passageway 51 for the extrusion of material as is described with reference to FIG. 3 and FIG. 4. The impingement elements are spaced about the smooth surface roller 1 so that a balancing of forces imposed on the roller is obtained.

In the embodiment shown in FIG. 5 and FIG. 6, the device is provided with a resilient mounting for the material impingement means. Thus, the roller 1 having necks 35 of reduced diameter received in the bearings 36, which are contained in bearing housings 37, is provided for cooperation with the impingement elements 2 which are mounted on the impingement element frame 26. A feed chute 55 is provided for passing material to the device, and a doctor blade 39 is provided for removal of material following the kneading thereof. The device as shown is for rotation of the roller in the direction indicated by the arrow 58'. A bed plate 52 and the blocks 53 for the bearing housings 37, are provided.

The resilient mounting 54 for the impingement elements 2 comprises a block 60 having a bore 58. A snubber 57 is placed in abutting engagement with the frame 26 for the impingement elements 2, and this snubber 57 also projects into the bore 58 of the block 60'. A spacer element 59 is also received in the bore 58, and interposed between the adjacent ends of the snubber 57 and spacer 59, is a pressure sensitive element 60, which can be a diaphragm element of any suitable form. This pressure sensitive element 60 is operatively connected with a pressure indicating element 61. It will be observed that as the load on the roller 1 increases, the torque imposed on the frame 26 of the impingement elements 2 will increase, and this torque will increase the load on the snubber 57. The load on the snubber will effect the operation of the diaphragm element 60 and the increasing load will be indicated by the pressure indicating element 61. The indicator 61 serves as means for sensing the response of the resilient mounting 54 to increased torque as is occasioned by increasing load on the device.

A device provided with a resilient mounting as described, can be used more efficiently, since, on the one hand, an indication is obtained to guide the operator as to whether full capacity of the device is being utilized, and, on the other hand, if it is desired to operate at less than full capacity, then the resilient mounting can be used to examine the operation to insure consistent operation, and the rate of feed can be adjusted to provide a constant indication of torque, whereby consistent performance of the device will be obtained.

In the embodiment shown in FIG. 5, and FIG. 6, the impingement elements 2 are two in number and these elements are spaced at equal intervals above the circumference of the roller 1. Further, the impingement elements 2 are radially spaced from the roller 1 so that material of the wedge forming between the roller and the impingement element, is extruded between the impingement element and the roller from the apex of the wedge. If desired, as is indicated in FIG. 6a, the impingement elements 2 can be arranged in close-fitting relation with the roller 1, so that substantially no extrusion of material between the impingement elements and the cutter occurs, and a passageway 42 through the impingement element, and for extrusion of material through the impingement element, can be provided. Thus, the embodiment of FIG. 6a is in general similar to the embodiments of FIG. 3 and FIG. 4.

The frame 26 can be made up of the horizontally extending H-members 63 and the vertically extending channel elements 64. The impingement elements 2 can be laid up on the upright portions of the H-elements and a filler 62 can be interposed in the space resulting from so laying up the impingement elements 2. Cooling passageways 65 and heating passageways 66 are formed in the filler 62, whereby the impingement elements 2 can be heated or cooled as is desired.

Referring to FIG. 7, in the kneading of material according to the invention, the wedge of material 6 forms between the roller 1 and the impingement means 2. As is indicated in FIG. 7, the impingement means can be a wall element which is spaced from and extends substantially tangential to the roller 1, and where the impingement element is spaced from the roller 1, material is extruded between the roller 1 and the impingement element 2 from the apex 68 of the wedge 6. By reason of the action of the roller on the wedge of material, the material is made to circulate within the wedge. This is indicated by the arrows 67. Further, it has been found that large size particles within the wedge tend to accumulate adjacent the broad end 69 of the wedge. This tendency is desirable as by reason thereof, large size particles which have not been thoroughly kneaded into the material mass to provide a homogeneous material, are retained in the wedge until the desired thorough mixing occurs. At such time, the thoroughly mixed material moves downwardly toward the apex of the wedge, and can then be extruded on from the apex and into the layer 38 which is carried away from the wedge by the roller 1. It has been found that the tendency of large size particles to segregate adjacent the broad end of the wedge, can be accentuated by providing an axially extending baffle 7. The baffle 7 is disposed between the roller 1 and impingement means 2, so that it is within and transverse to the wedge 6. The baffle 7 is spaced from the roller 1, whereby in the kneading of material, the relatively large size particles accumulate above (upstream) of the baffle and are retained there for extra kneading thereof. In FIG. 7, the baffle 7 is secured to and projects from the impingement means.

There are various known kneading devices in which a roller or rollers are utilized and material is fed to the roller or rollers at one location along the length thereof, and is withdrawn, following kneading, at a location axially spaced from the feed location. Such a device is illustrated in Swallow Patent 2,645,813. In such operation, the material under the conditions employed flows from the inlet to the outlet by reason of the condition of the material, or by reason of means utilized to provide the desired movement of the material. A baffle according to the invention can advantageously be utilized in combination with kneading apparatus of this type. Such a combination is illustrated in FIG. 8.

Figure 9:
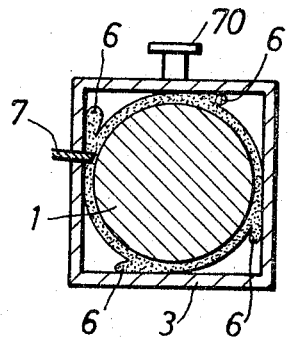
FIG. 9 is taken along line 9—9 in FIG. 8.

In FIG. 8, a roller 1 is contained within the casing 3, and the casing 3 is provided with an inlet 70 and an outlet 71, the inlet and outlet being axially spaced. A baffle 7 secured to the casing 3 projects into the wedge 6 of material worked between the roller and the impingement means and provides a separation of thoroughly kneaded material from material which is not thoroughly kneaded. The baffle serves to move up within the kneading device material which has not been thoroughly kneaded, and to let material which has been thoroughly kneaded pass on to the outlet of the device. Advantageously, the baffle can extend but part-way between the inlet 70 and the outlet 71. Thus, the baffle can be one third of the axial distance between the inlet and the outlet, and it can be centrally positioned between the inlet and the outlet. In operation of the apparatus shown in FIG. 8 and FIG. 9, material for kneading can be introduced by gravity through inlet 70. Due to the operation of the roller 1 the material will be distributed about the roller and over the length of the roller as is indicated in the cross-sectional view shown in FIG. 9. In the wedges 6, the material will be under pressure, and, accordingly, material in the wedge along the bottom of the casing 3, over the outlet 71, will be forced out of the casing.

Figure 10:
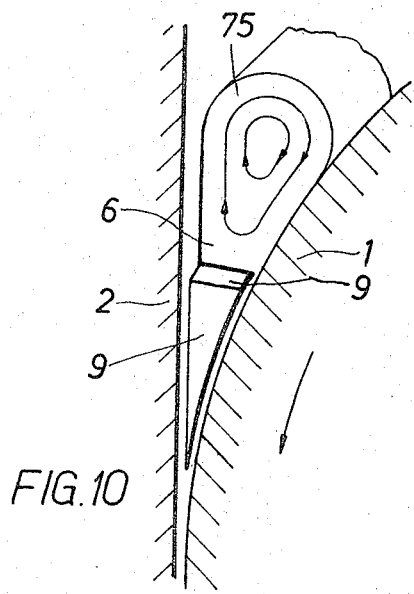
FIG. 10 is an isometric, axially transverse cross-section of a portion of a device according to the invention, and including a weir disposed transverse to the axis of the roll of the device.
Figure 13:
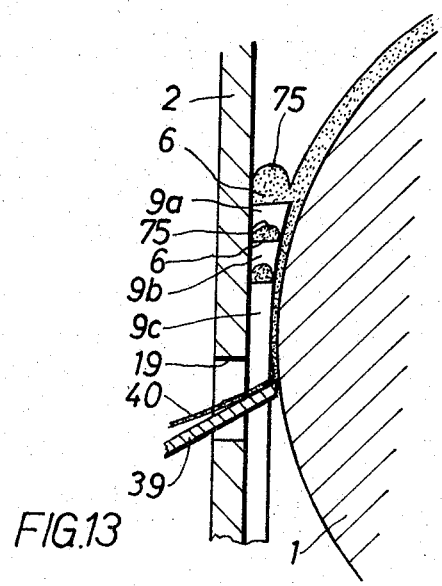
FIG. 12 and FIG. 13 are taken, respectively, along lines 12—12 and 13—13 in FIG. 11.

In another embodiment of the invention for use in combination of the type having an inlet and an outlet which are axially spaced, is depicted in FIG. 10. In this embodiment, an axially transverse weir, formed integral with the impingement element 2, is disposed between the roller 1 and the impingement element 2, and transverse to the wedge 6. The weir 9 serves to control passage of the material in the wedge in the axial direction.

In utilization of a weir according to the invention, the weir can extend from the apex of the wedge toward the broad end of the wedge and terminate short of the broad end of the wedge so that in operation, material will pass from one side of the weir to the other, by overflowing the weir. Such an arrangement is depicted in FIG. 10. On the other hand, the weir can extend from adjacent the broad end of the wedge toward the apex thereof, and terminate short of the apex, so that in operation, material will pass from one side of the weir to the other by flowing under the weir. A construction according to this last description is depicted in FIG. 14, wherein the weir 10 extends from the broad end 69 of the wedge 6 and terminates at 73, a point short of the apex 68 of the wedge 6.

An embodiment wherein the weir extends upwardly from the apex of the wedge is indicated in FIG. 11, and herein, a plurality of weirs are provided. The apparatus is of the type having an inlet and outlet which are axially spaced. Over that portion of the roller adjacent the inlet 70, no weirs are provided and kneading occurs by reason of the working of the material in a plurality of wedges disposed about the periphery of the roller 1, in a manner corresponding with the positioning relative to the roller 1 of impingement means 2. Over that portion of the apparatus extending from about the center of the roller 1 to the outlet end of the roller 74, weirs 9a, 9b, and 9c are disposed at axially spaced intervals. The height of these weirs decreases in the direction of the outlet end 74 of the roller 1. A withdrawal means is provided adjacent the weir 9a and on the inlet side thereof, and in like manner, each weir is provided with a withdrawal means on the side thereof adjacent the inlet 70. Further, a withdrawal means is provided on the outlet side of the weir proximate to the outlet end 74 of the roller 1. The withdrawal means can be doctor blades 39. In the operation of device, large size particles tend to accumulate in the head 75 (see FIG. 10) of the wedge 6 which forms on the upstream side of the weir 9a. The impingement means 2 is spaced from the roller 1 so that material is extruded from the apex of the wedge 6 and passes from the wedge. The material so extruded from the wedge is thoroughly kneaded and can be removed from the kneading device. Removal is effected by the doctor blade 39 positioned on the upstream side of the weir 9a. Large size particles in the head of the wedge 6 continue to be worked while being retained in the head. Some of the material in the head of the wedge, however, overflows the weir and is then worked by the roller along that length of the roller between the weirs 9a and 9b. Upon the material being worked to an extent such that thorough mixing results, thoroughly mixed material is extruded from the wedge and is then withdrawn from the apparatus by the doctor blade 39 positioned on the upstream side of the weir 9b and downstream of the weir 9a. At the same time, material which has not been thoroughly kneaded, remains in the head of the weir and some of this material overflows the weir 9b and is subjected to further working along that portion of the roller between the weir 9b and the weir 9c. Thus, the apparatus works to retain material for kneading so long as this is necessary to effect the desired thorough kneading. Material which overflows the last weir, 9c, in FIG. 11, is worked until it is kneaded to the point that it can be extruded from the wedge from the apex thereof, and is then withdrawn from the device by a doctor blade positioned on the downstream side of the weir 9c. In operation of the apparatus shown in FIG. 11, material is introduced by outlet 7. The introduction can be by gravity. As in the case of the apparatus shown in FIG. 8, the roller 1 works the material and distributes it over the length of the casing, as is shown in the cross-sectional view in FIG. 12. The material is withdrawn by the doctor blades 39, as is described in detail above.

In the embodiment depicted in FIGS. 14–17, a device having roller 1 is provided with inlet means 76 disposed intermediate the ends of the roller and means for withdrawing material kneaded by the device are provided at each end of the roller 1. Further, intermediate the inlet 76 and the ends of the roller 1, weirs 10 are provided. These weirs are integral with the impingement element 2 and extend from adjacent the broad end of the wedge toward the apex thereof and terminate short of the apex. A plurality, as illustrated, two, weirs are provided on each side of the inlet 76, and for the weir on each side of the inlet, the approach to the apex of the wedges decreases in the direction away from the feed means. In operation of the device illustrated in FIG. 15, material fed through the inlet 76 is worked between the weirs adjacent the inlet, and large size particles within the material being kneaded accumulate in the head of the wedge, whereas material which has been thoroughly kneaded moves downwardly within the wedge towards the apex thereof. The material in the lower part of the wedge can flow under the weirs and is then worked between the two weirs disposed on each side of the inlet 76. Here the material is further worked, and again larger size particles accumulate in the head of the wedge, whereas the fully kneaded material can pass under the weirs adjacent the ends of the rollers 1. The weirs are of such height that overflow of material does not occur. In operation as described, the levels 77, 78, and 79 form. Adjacent each end of the roller 1, means are provided for withdrawing the material which has passed each of the weirs interposed in its course. Thus, doctor blades 39 serve to withdraw the material.

The device further includes a head cutter 80 at each end of the roller 1. Each of these head cutters is disposed on the outlet side of weir positioned remote from the feed inlet 76 and serves the function of separating material from the broad end or head of the wedge, whereby to remove from the wedge material which contains relatively large particles which have not been thoroughly intermixed with the material being treated. As can be best seen in FIG. 17, the head cutter 80 is fixably secured to the impingement element 2 and extends therefrom into engagement with the roller 1, so that is projects through a portion of the head 69 of the wedge 6 of material. As indicated in FIG. 15, the head cutter 80 extends over but a part of the distance between the end of the roller 1 and the adjacent weir. Material which is worked onto the upper side of the head cutter 80 is separated from the wedge by the head cutter and moves as a layer 82 through the opening 81, so as to be displaced to without the device.

Material which has been thoroughly kneaded is extruded from the wedge of material adjacent the ends of the roller 1, and is removed from the device by doctor blades 39 (see FIG. 15). In the operation of apparatus as is shown in FIG. 15, material to be kneaded can be introduced through the outlet 76 by gravity. The roller 1 works the material and distributes it over the length of the casing 2 as is indicated in FIG. 15 and FIG. 16. The material is removed from the casing by the head cutter 80 and by the doctor blades 39.

While the construction wherein the weir terminates short of the apex so that material flows under the weir, has been illustrated for a device wherein material is fed to the center of a roller and moves axially outward toward each end thereof, it will be appreciated that construction of the type referred to could be employed in respect to apparatus wherein the material is fed at one end of the roller and the kneaded product is withdrawn from the other end.

In the embodiments wherein a weir or weirs are employed, the weir can be integral with the impingement elements and can extend from the impingement elements to close fitting relation with the roller, and such construction is preferred. If desired, however, the weirs can extend toward the roller and terminate in spaced relation with respect thereto. Preferably, in the embodiments where a weir or weirs are employed, the impingement means is spaced from the roller so that extrusion of material from the apex of the wedge occurs.

For the purpose of 35 U.S.C. 120, specific reference is made to earlier filed application, Ser. No. 712,582, filed Jan. 31, 1958.

What is claimed is:

1. Apparatus for the kneading of material, comprising a roller, means for rotating said roller, and impingement means disposed proximate to the roller and fixably mounted with respect to said roller, said impingement means being for accumulation of material to be kneaded in a wedge between the impingement means and the roller and in which the material moves for the kneading thereof, the accumulation and movement being response of the material through action of the roller in forcing it into impingement with the impinging means, and a baffle disposed between the roller and impingement means within and transverse to the wedge of material, the baffle being spaced from the roller whereby in the kneading of the material, relatively large size particles will accumulate above the baffle and be retained there for extra kneading thereof.

2. Apparatus according to claim 1, said baffle being secured to and projecting from the said impingement means.

3. Apparatus according to claim 2, the impingement means being spaced from the roller for extrusion of material at the apex of the wedge of material between the roller and the impingement means.

4. In a kneading device comprising a roller, means for rotating the roller, means for cooperation with the roller to knead the material in response to rotation of the roller, an inlet for feeding material to the roller and said cooperating means for the kneading thereof, an outlet axially spaced from said inlet and for withdrawing material following the kneading thereof, the improvement which comprises impingement means disposed proximate to the roller and fixably mounted with respect to said roller for accumulation of material to be kneaded in a wedge between the impingement means and the roller and in which the material moves for the kneading thereof, said accudulation and movement being response of the material to action of the roller in forcing it into engagement with the impinging means, and a baffle disposed between the roller and impingement means within and transverse to the wedge of material, the baffle being spaced from the roller, whereby in the kneading of material, relatively large size particles will accumulate above the baffle and be retained there for the extra kneading thereof.

5. A kneading device according to claim 4, said baffle being disposed intermediate said inlet and said outlet and extending axially along said roller a distance substantially less than the distance between said inlet and said outlet.

6. A kneading device according to claim 4, said baffle being secured to and projecting from the impingement means.

7. A kneading device according to claim 6, the roller and impingement means being spaced for extruding material from the wedge between the roller and the impingement means at the apex of the wedge.

8. In a kneading device comprising a roller, means for rotating the roller, means for cooperation with the roller to knead the material in response to rotation of the roller, an inlet for feeding material to the roller and said cooperating means for the kneading thereof, an outlet axially spaced from said inlet and for withdrawing material following the kneading thereof, the improvement which comprises impingement means disposed proximate to the roller and fixably mounted with respect to the roller for accumulation of material to be kneaded in a wedge between the impingement means and the roller and in which the material moves for the kneading thereof, said accumulation and movement being response of the material to action of the roller in forcing it into impingement with the impinging means, and an axially transverse weir disposed between the roller and impingement means and transverse to the wedge of material for controlling axially directed passage of the material in the wedge.

9. A kneading device according to claim 8, the impingement means being spaced from the roller for extrusion of material from the wedge between the roller and the impingement means at the apex of the wedge, means for withdrawing kneaded material extruded from the wedge as aforesaid, said withdrawal means being disposed adjacent the weir and on the inlet side thereof, and another withdrawal means on the outlet side of said weir for withdrawing kneaded material which passes said weir.

10. A kneading device according to claim 9, and including a plurality of said weirs, said weirs being disposed at axially spaced intervals along the impinging means, the height of said weirs measured from the wedge apex decreasing in the direction away from the inlet, withdrawal means on the inlet side of each weir adjacent thereto and for withdrawing material extruded from the apex of the wedge on the inlet side thereof.

11. A kneading device according to claim 10, including withdrawal means on the inlet remote side of the lowest weir.

12. A kneading device according to claim 9, the weir extending from the apex of the wedge toward the wedge.

13. A kneating device according to claim 11, said weirs each extending from the apex of the wedge toward the body of the wedge.

14. A kneading device according to claim 8, said weir extending from adjacent the broad end of the wedge toward the apex thereof and terminating short of the apex.

15. A kneading device comprising a roller, means for rotating the roller, impingement means disposed proximate to the roller and fixably mounted with respect to said roller for accumulation of material to be kneaded in a wedge between the impingement means and the roller and in which the material moves for the kneading thereof, said accumulation and movement being response of the material to action of the roller in forcing the material into engagement with the impinging means, inlet means for feeding material to be kneaded to the roller and impingement means intermediate the ends of the roller, and an axially transverse weir disposed on each side of said feed means between the roller and impingement means and transverse to the wedge of material for controlling axially directed passage of the material in the wedge, each of said weirs extending from above the broad end of the wedge toward the apex thereof and terminating short of the apex, whereby said weirs are adapted to permit passage thereby by flow of the material thereunder, and means for withdrawing material from the kneading device across each of said weirs from said inlet.

16. A kneading device according to claim 15, wherein there are at least two weirs as aforesaid on each side of the feed means and intermediate the feed means and the end of the roller, the approach of said weirs to the wedge apex decreasing in the direction away from said feed means.

17. A kneading device according to claim 16, and a withdrawal means intermediate each end of the roller and its adjacent weir.

18. A kneading device according to claim 17, said impinging means being spaced from the roller for extrusion of material from the wedge between the roller and the impingement means and from the apex of the wedge.

19. A kneading device according to claim 16, and a head cutting means intermediate each end of the roller and its adjacent weir, said head cutting means being for separating material from the broad end of the wedge thereof to remove from said material by said means a portion of the head thereof.

20. A kneading device according to claim 15, a head cutting means on the side of each weir remote from said feed means for separating material from the broad end of the wedge thereof to remove from said material by said head cutting means a portion of the wedge head.

21. A kneading device according to claim 15, and including at least two weirs as aforesaid, the approach to the wedge apex of each weir decreasing in the direction away from the feed means.

22. A kneading device comprising a roller, means for rotating said roller, impingement means disposed proximate to said roller and fixably mounted with respect to said roller, the impingement means being for accumulation of material to be kneaded in a wedge between the impingement means and the roller and in which the material moves for the kneading thereof, said accumulation and movement being response of the material to action of the roller in forcing the material into impingement with the impinging means, feed means for feeding material to the roller, and withdrawal means for withdrawing kneaded material from the device, said feed means and withdrawal means being axially spaced, an axially transverse weir disposed between the roller and impingement means and transverse to the wedge of material for controlling axially directed passage of material in the wedge, said weir extending from adjacent the broad end of the wedge toward the apex thereof and terminating short of said apex, whereby material kneaded in the device passes under said weir from the feed means side thereof to the kneaded material withdrawal side thereof, said weir being disposed intermediate said feed means and said withdrawal means.

23. A kneading device according to claim 22, the impingement means being spaced from the roller for extrusion of material from the wedge thereof between the roller and the impingement means and from the wedge apex.

24. A kneading device according to claim 22, and head cutting means on the side of the weir remote from the feed means for separating material from the broad end of the wedge thereof to remove from said material by said head cutting means a portion of the head thereof.

References Cited by the Examiner
UNITED STATES PATENTS

| | | | |
|---|---|---|---|
| 1,262,246 | 4/1918 | Pieler | 18—12 |
| 2,171,039 | 8/1932 | Meakin | 18—12 |
| 2,520,337 | 8/1950 | Roberts | 18—12 |
| 2,615,205 | 10/1952 | Gray | 264—174 |
| 2,645,813 | 7/1953 | Swallow | 18—2 |
| 2,803,039 | 8/1957 | Marshall | 264—349 |

WILLIAM J. STEPHENSON, *Primary Examiner.*